Patented July 17, 1923.

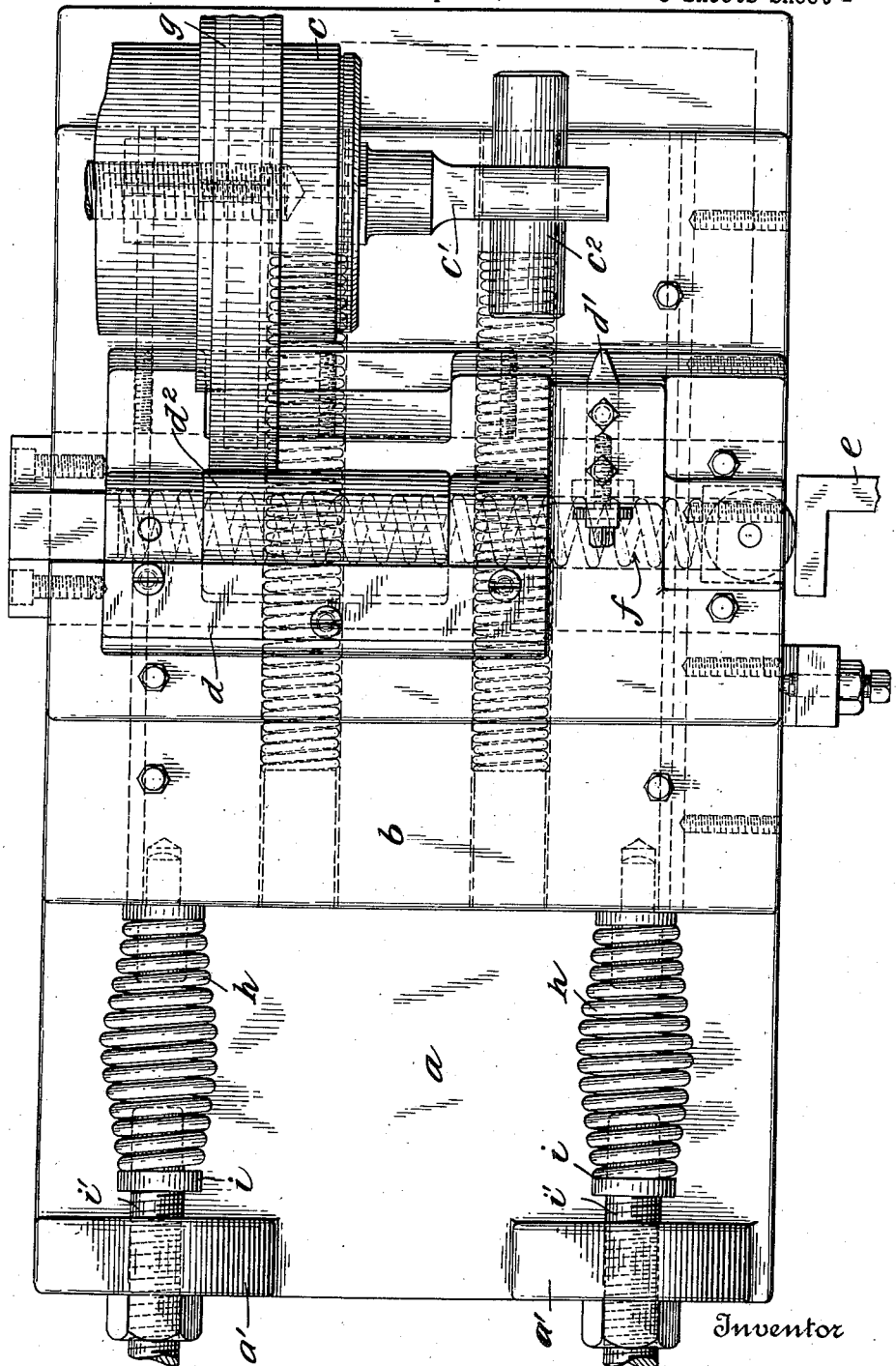

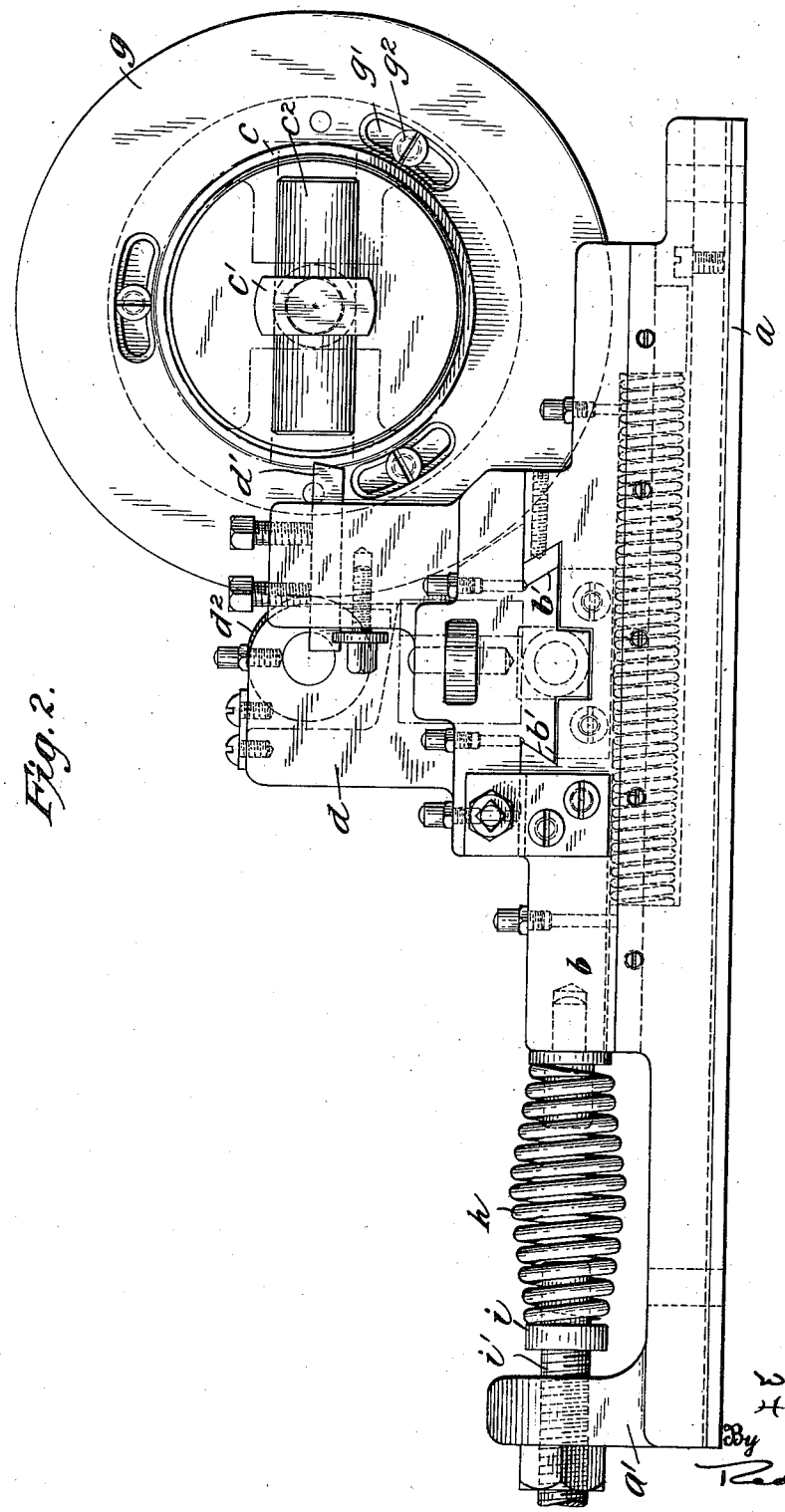

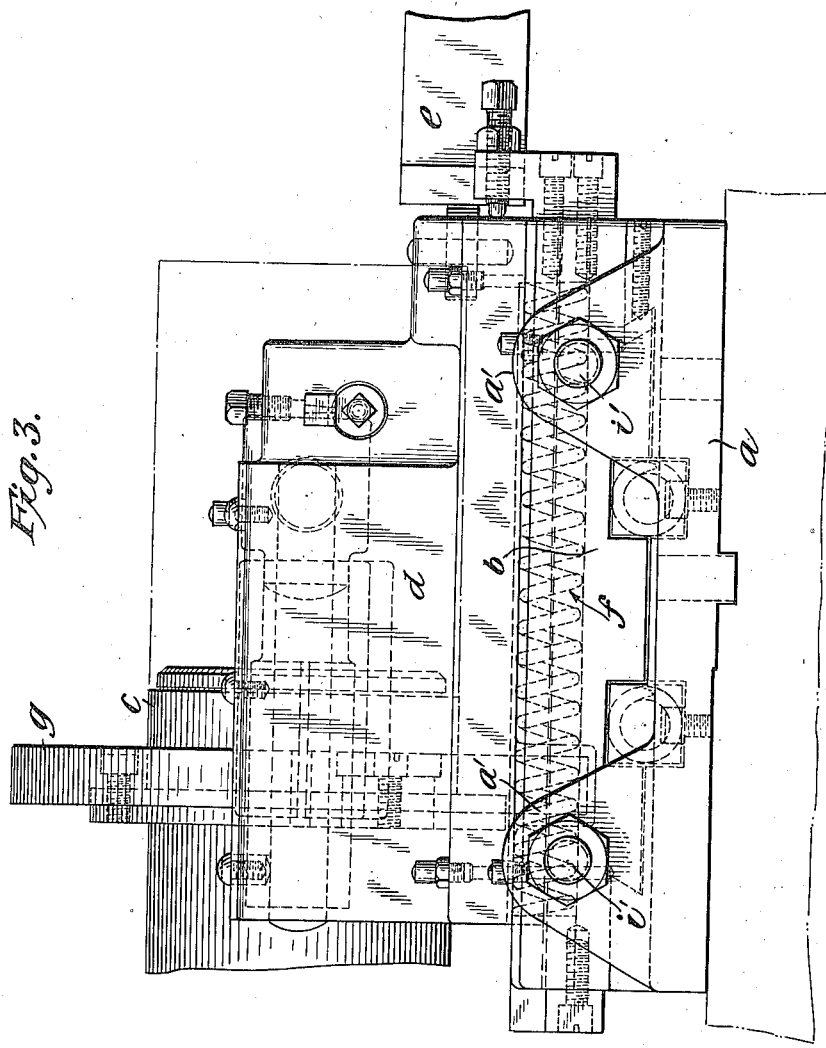

1,461,884

UNITED STATES PATENT OFFICE.

WILLIAM R. ADAMS, OF PLAINFIELD, AND HARRY L. POUND, OF NORTH PLAINFIELD, NEW JERSEY, ASSIGNORS TO INTERNATIONAL MOTOR COMPANY, OF NEW YORK, N. Y., A CORPORATION OF DELAWARE.

FIXTURE FOR TURNING MACHINES.

Application filed September 4, 1920. Serial No. 408,237.

*To all whom it may concern:*

Be it known that we, WILLIAM R. ADAMS and HARRY L. POUND, citizens of the United States, and respectively residing in Plainfield and in North Plainfield, in the State of New Jersey, have jointly invented certain new and useful Improvements in Fixtures for Turning Machines, of which the following is a specification, reference being had to the accompanying drawings, forming a part hereof.

This invention relates to a fixture which can be attached to turning machines for cutting stock eccentrically and is designed primarily with reference to such a fixture for the turning of eccentric reliefs for oil on pistons. It is desirable to turn off eccentric reliefs on the pistons of internal combustion engines in line with the wrist pins for the oil and this operation has usually been performed by grinding off, making a relatively expensive and irregular finish. In accordance with the present invention it is proposed to turn off the eccentric reliefs by means of a cutting tool which may be associated with a turning machine of any standard type and which will be controlled by the machine in a common manner and require no more than the usual attention from the machine attendant. In carrying out the invention there is provided a spring-pressed reciprocable tool head which engages an oval shaped cam mounted on the chuck, this cam in its rotation reciprocating the tool and permitting it to engage the work periodically at diametrical sides of the piston so as to cut the reliefs. The details of one particular embodiment will appear from the accompanying drawings, in which—

Figure 1 is a view in plan of the improved fixture showing its association with a turning machine of known type.

Figure 2 is a view in side elevation of parts shown in Figure 1.

Figure 3 is a view in rear elevation of a fixture showing its relation to the chuck and a feeding element.

As the description proceeds it will be clear to the mechanic that the improved attachment is not limited in its application to any particular type of turning machine nor is the invention to be limited to the details of the particular embodiment of fixture illustrated herein, the principle of operation and the results achieved, all as brought out by the illustrated embodiment, being sufficient information to one skilled in the art for the construction of other operative embodiments.

The bed of the turning machine has secured thereto a cross-way $a$ in which is slidably mounted a cross-slide $b$ for reciprocation towards and away from the work. The work operated upon which, in the present instance, is assumed to be a piston, is secured in a rotatable chuck $c$ by any suitable means, illustrated as a plunger $c'$ and transverse holding pin $c^2$ passing through the plunger and adapted to engage the piston indicated in dotted lines in Figure 2.

The tool head $d$ in which the tool $d'$ is supported in operative relation to the work travels transversely of the cross-slide $b$ in ways $b'$ moving longitudinally of the piston under the influence of an actuating arm $e$ which may be connected operatively to the turning machine in any approved manner and feed the tool transversely in accordance with common practice and against the tension of a spring $f$ which serves to return the tool to initial position automatically after each cut is made. On the tool head $b$ is mounted an elongated roller $d^2$ adapted to bear against a cam $g$ mounted adjustably on the chuck $c$ through slots $g'$ and studs $g^2$ permitting angular adjustment of the cam about its axis. It is evident that the cam may take any form according to the character of the cut desired, although in the illustrated embodiment where reliefs are cut at diametrically opposite sides an oval cam is employed.

The cross-slide $b$ with the tool head $d$ is pressed toward the work by means of springs $h$ which may seat on the rear edge of the cross-slide and on rings $i$ threaded adjustably on bolts $i'$ secured in lugs $a'$ carried with the base $a$ of the fixture. By determining properly the position of the adjustable spring seats $i$ it is evident that the degree of pressure exerted on the cross-slide $b$ can be regulated to a nicety.

In using the improved fixture and assuming that eccentric reliefs are to be cut on pistons in the line of the wrist pins, the piston is secured in the chuck $c$ as through retaining devices $c'$, $c^2$. The tool $d'$ will be positioned automatically by the spring $f$ in proper relation to the piston considered lengthwise. The cam $g$ will be adjusted axially through the slot and stud connection $g'$, $g^2$, so as to permit the tool $d'$ to engage the outer surface of the piston head at diametrically opposite points along the lines on which the reliefs are to be cut. The springs $h$ acting through the cross-slides $b$ and the tool head $d$ will press the roller $d^2$ firmly against the periphery of the cam $g$, this engagement limiting the inward position of the tool $d'$ with relation to the piston. When the machine is started up, rotation of the cam $g$ will result in forcing the cross-slide $b$ with the tool $d'$ away from the piston against the pressure of the springs $h$. The piston, rotating with the cam $g$, will present the proper portion to be engaged by the tool after every half rotation of the cam, the tool $d'$ meanwhile being fed longitudinally of the piston and turning the reliefs in the usual manner. After the cuts have been made the piston will be removed from the chuck and the tool head returned to initial position to operate on another piston.

As pointed out hereinbefore the invention is not limited to the type of machine with which the fixture is associated, to the details of the fixture itself, nor to the precise outline of the controlling cam, nor the work operated upon.

We claim as our invention:

1. A fixture for turning machines, comprising a cross-slide mounted to reciprocate transversely of the work, a tool holder carried by the cross-slide and mounted to reciprocate transversely thereof in a direction longitudinally of the work, means for automatically reciprocating the cross-slide, and means for automatically reciprocating the tool holder.

2. A fixture for turning machines, comprising a cross-slide mounted to reciprocate transversely of the work, springs for moving the cross-slide toward the work, a cam, carried by the machine chuck, for moving the cross-slide away from the work, a tool holder carried by the slide and mounted to reciprocate transversely thereof in a direction longitudinally of the work, and means for automatically reciprocating the tool holder.

3. In combination with the chuck of a turning machine, a fixture for the machine comprising a base, a cross slide mounted on the base, a tool head carried by the cross slide and movable transversely thereof and longitudinally of the work, a cam carried by the chuck and operatively engaging the cross slide for controlling the crossways movement thereof, and means for reciprocating the tool head transversely of the cross slide.

4. A fixture for a turning machine, comprising a cross slide having springs for pressing the cross slide toward the work, a cam carried by the chuck for pressing the cross slide away from the work, a tool head movable in ways on the cross slide transversely thereof and longitudinally of the work, and a spring for moving the tool head longitudinally of the work.

5. In combination with the chuck of a turning machine, a fixture secured to the machine and comprising a base, a cross-slide mounted movably thereon, adjustable springs interposed operatively between the cross-slide and the base, a tool head mounted to reciprocate in transverse ways on the cross-slide, means to feed the tool longitudinally with relation to the work, an elongated roller carried on the tool head and an oval shaped cam mounted adjustably on the chuck and engaged by the roller.

This specification signed this 30th day of Aug., A. D. 1920.

WILLIAM R. ADAMS.
HARRY L. POUND.